United States Patent [19]

Corcoran et al.

[11] Patent Number: 4,995,007
[45] Date of Patent: Feb. 19, 1991

[54] METHOD FOR PROCESSING SEISMIC DATA

[75] Inventors: Chris T. Corcoran, Houston; Jacques P. Leveille, Bellaire, both of Tex.; Eduardo S. Velasco, Mansfield, Pa.

[73] Assignee: Shell Oil Company, Houston, Tex.

[21] Appl. No.: 454,572

[22] Filed: Dec. 21, 1989

[51] Int. Cl.$^5$ ............................................... G01V 1/36
[52] U.S. Cl. ...................................... 367/52; 367/50; 367/47; 364/421
[58] Field of Search .................... 364/421; 367/38, 47, 367/50, 51, 52

[56] References Cited

U.S. PATENT DOCUMENTS

| | | | |
|---|---|---|---|
| 4,534,019 | 8/1985 | Wiggins et al. | 367/75 |
| 4,646,239 | 2/1987 | Bodine et al. | 364/421 |
| 4,736,349 | 4/1988 | Goins et al. | 367/75 |
| 4,802,146 | 1/1989 | Moeckel | 367/52 |
| 4,858,200 | 9/1989 | Goins | 367/75 |
| 4,858,201 | 8/1989 | Goins et al. | 367/47 |
| 4,858,202 | 8/1989 | Fitch et al. | 367/47 |

FOREIGN PATENT DOCUMENTS 0309151 3/1989 European Pat. Off. .
0309152 3/1989 European Pat. Off. .

OTHER PUBLICATIONS

Spratt, S., 1987 SEG Expanded Abstracts, S 10.7.
Swann, H. W., 1988 SEG Expanded Abstracts, S 20.2.
"Effect of Normal Moveout on a Seismic Pulse", by Dunkin, J. W. and Levin, F. K., Geophysics, vol. 38, No. 4, pp. 635–642 (1973).

Primary Examiner—Ian J. Lobo

[57] ABSTRACT

The present invention provides improved methods for processing seismic data which include the effects of offset dependence of reflection amplitudes. The methods of the present invention provide a way to estimate and remove the effect of stretch and small moveout velocity errors on the measurement of offset dependence for the case of small offsets (less than about 30 degrees angle of reflection). Further, the methods of the present invention provide an improved estimate of the correct movement velocity.

5 Claims, 11 Drawing Sheets

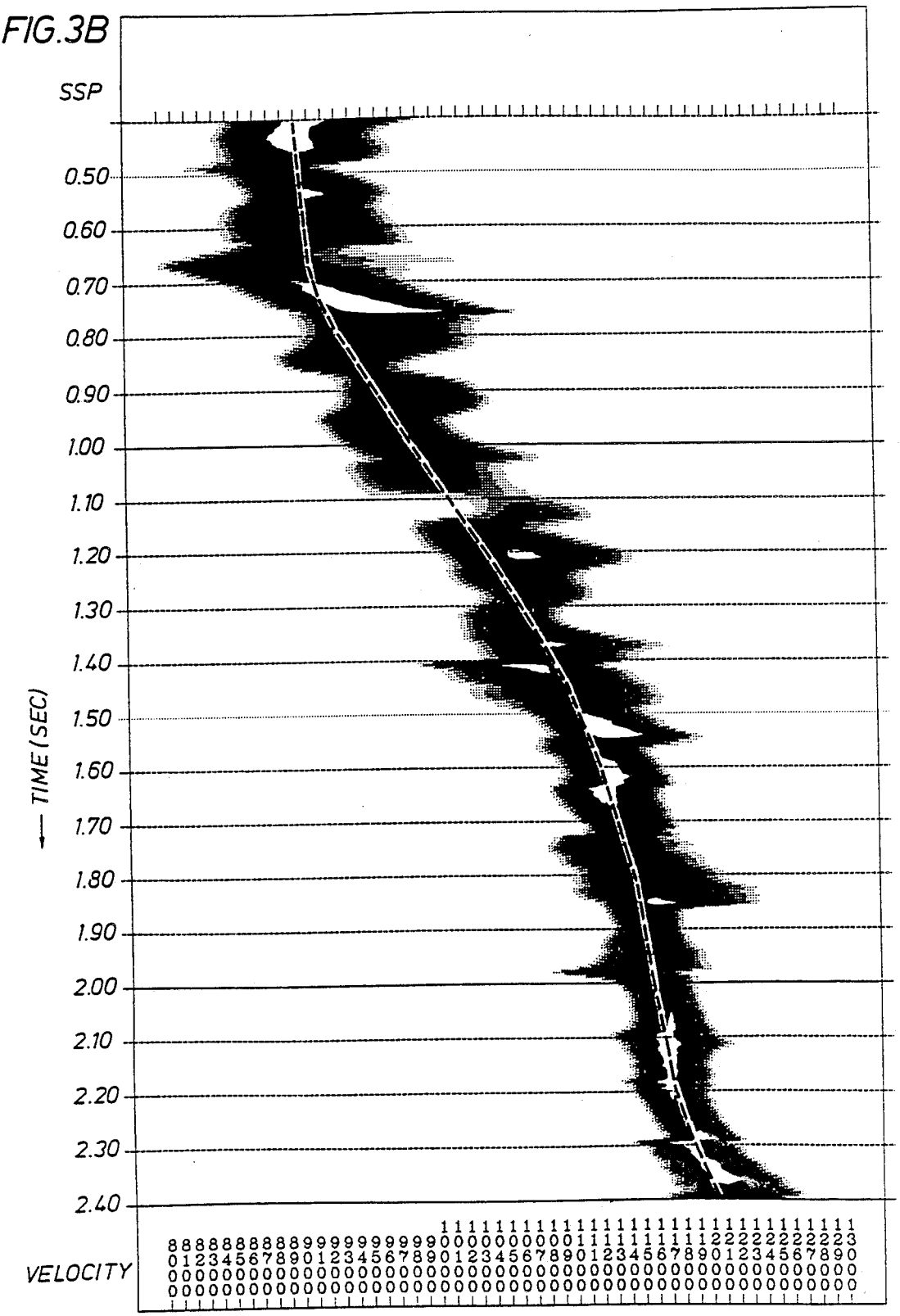

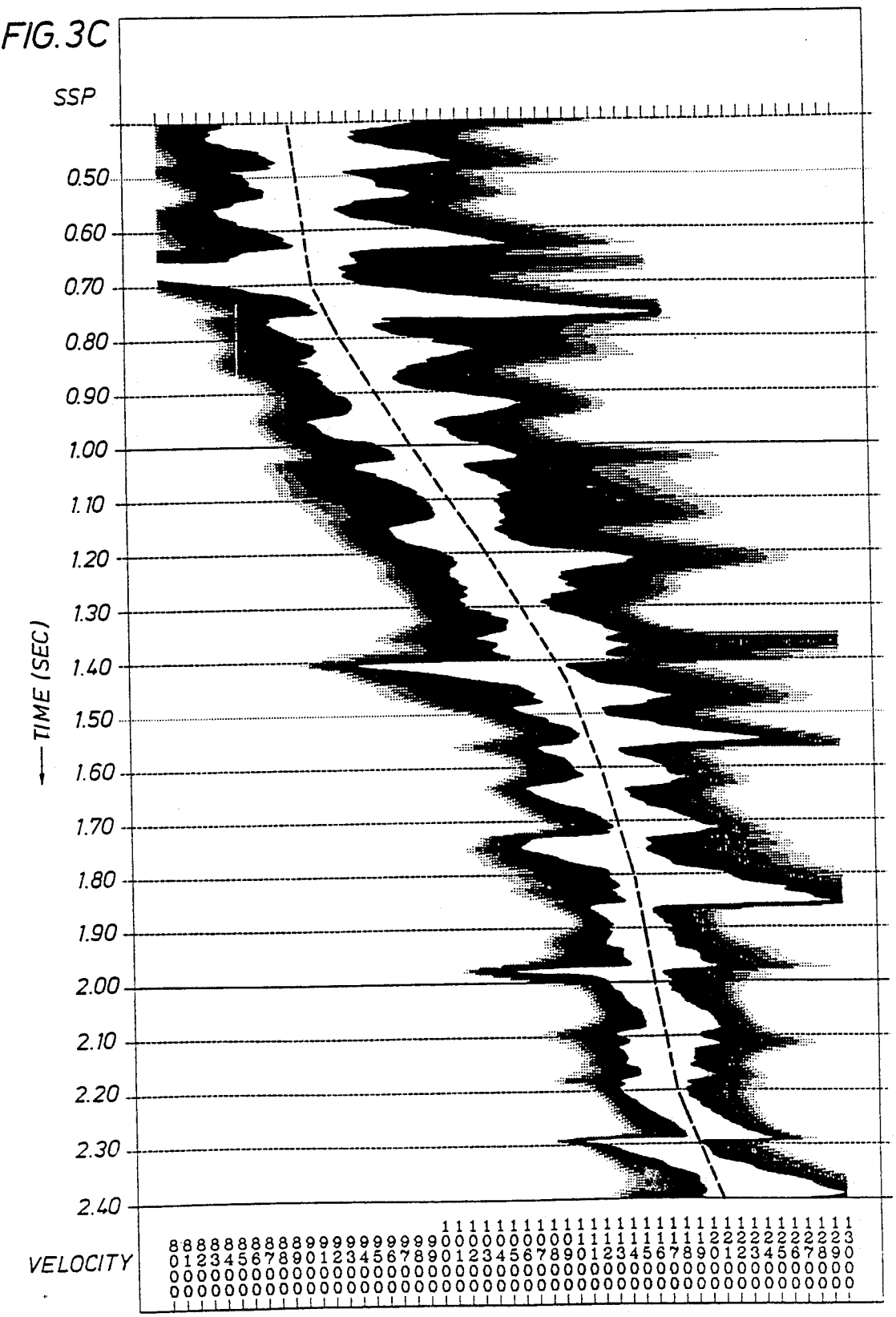

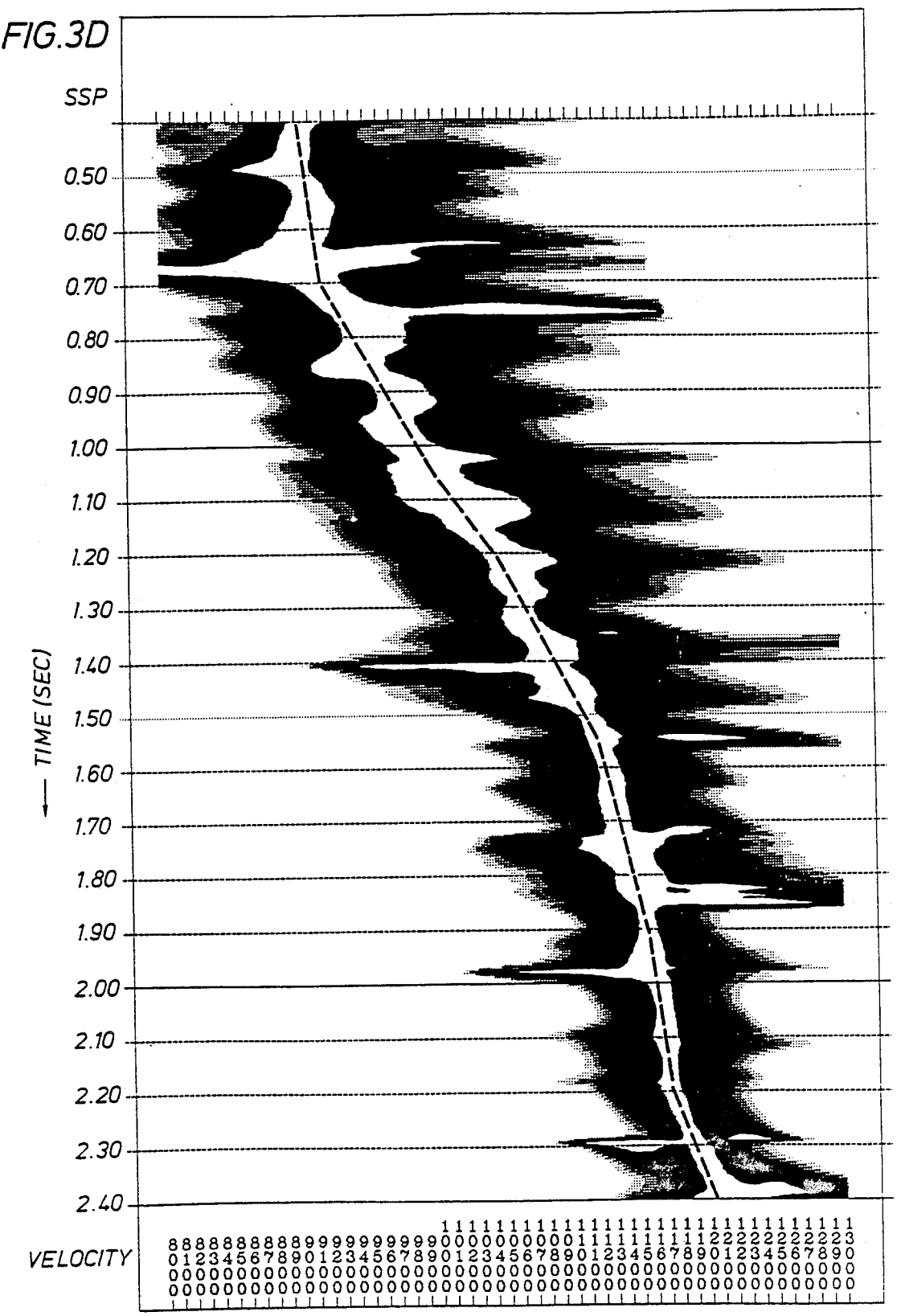

METHOD FOR PROCESSING SEISMIC DATA

CROSS-REFERENCE TO RELATED APPLICATION

This invention is related to the invention described in copending U.S. Pat. application Ser. No.174,658, filed Mar. 29, 1988 and assigned to the assignee of the present invention. This related application is incorporated herein by reference.

BACKGROUND OF THE INVENTION

The present invention relates to exploration seismic reflection surveying and more particularly, relates to the processing of exploration seismic reflection data to enhance information in seismic signals reflected from contrasts in elastic constants, velocities, and/or densities in the subsurface of the earth.

The methods of the present invention which are described herein are generally discussed in terms of compressional wave (PP) seismic data, acquisition, and processing, which is the most common form of seismic data used in exploration seismology. However, it should be understood that these methods are equally applicable to shear wave seismic data and to converted wave seismic data.

Conventional land or marine seismic acquisition techniques involve the use of an appropriate source to generate seismic energy and a set of receivers, spread out along or near the surface of the earth on land, or at or near the water surface or water bottom in a water covered area, to detect any reflected seismic signals due to seismic energy striking subsurface geologic boundaries. These signals are recorded as a function of time and subsequent processing of these time varying signals, i.e. seismic "traces" or seismic data, is designed to reconstruct an appropriate image of the geologic boundaries of the subsurface and to obtain information about the subsurface materials. In simplistic terms, this conventional process has a seismic wave, from a source of seismic energy, traveling down into the earth, reflecting from a particular geologic interface (i.e., a contrast in elastic constants, velocities, and/or densities), and returning to the surface, where it may be detected by an appropriate detector.

As noted in the above-referenced related application, seismic data is processed to obtain information about the subsurface over which seismic data has been acquired. More particularly, one conventional processing technique is hyperbolic normal moveout (NMO) velocity analysis and subsequent "stacking" of the NMO corrected data. However, such conventional NMO techniques ignore the offset dependence of the seismic data. The related application provides methods for more accurately estimating moveout velocities while obtaining consistent estimates of the offset dependence and the zero offset information of the seismic data.

The estimate of the offset dependence of the amplitude (as described in the related application) has been somewhat limited by the coupling of the offset dependence and moveout velocity. Further, the conventional process of hyperbolic normal moveout correction distorts the amplitude and frequency of the seismic data, such an effect is commonly referred to as "stretch". In practice with actual field data, the measured offset dependence is frequently contaminated by relatively small moveout velocity errors, as well as other errors related to the process of moveout correction.

Thus, a method for determining the effect of moveout velocity errors and other errors (such as stretch) on the measurement of such offset dependence for the case of small offsets is needed. Such a method can simultaneously determine a more accurate measure of amplitude variation with offset and normal incident reflection amplitude, as well as moveout velocity. However, it should be noted that given the correct moveout velocity and in the absence of other known effects, the techniques and methods in the related copending application provide the correct offset dependence. The terms "amplitude variation with offset", "variation with offset", "offset dependence", and "offset dependence of amplitude" are used interchangeably herein.

These and other limitations and disadvantages of the prior art are overcome by the present invention, however, and an improved method is provided for determining from seismic data, normal moveout velocities, and associated dynamic corrections that preserve amplitude versus offset information to provide better estimates of effective velocities, the normal incidence reflection amplitudes, and the offset dependence of the reflection amplitudes.

SUMMARY OF THE INVENTION

In a preferred embodiment of the present invention seismic data that has been acquired employing a plurality of known source and receiver locations is processed to provide improved simultaneously determined and self-consistent representations of (a) zero-offset reflection amplitudes, (b) variation with offset of reflection amplitudes, and (c) effective velocities, all determined from the seismic data. The methods of the present invention employ amplitude versus offset information obtained during such processing to provide improved velocity information and associated dynamic corrections that are not available from conventional techniques and to provide improved simultaneous quantitative estimates of variation with offset of reflection amplitudes. These methods include improving estimates of normal moveout velocity analysis, including appropriate offset dependence, and accordingly improved dynamic correction of the data. The improved velocity analysis preferably uses offset dependent parameters (zero-offset amplitude and amplitude variation with offset) determined from the data. The effects of stretch and velocity errors are removed from the offset dependent parameters; these corrected offset dependent parameters and correction coefficients may then be used to provide improved velocity spectra from which improved velocities may be selected. Improved offset dependent parameters corresponding to such selected improved velocities may then be employed for further processing and/or analysis.

It is an object of the present invention to provide a method for performing improved normal moveout corrections which allows for determination from seismic data of reflection amplitudes at zero offset or normal incidence.

It is an object of the present invention to provide a method for performing improved normal moveout corrections which allows for determination from seismic data of reflection amplitude dependence on offset.

It is an object of the present invention to provide a method for performing improved normal moveout corrections which allows for determination from seismic data of improved moveout velocities.

It is an object of the present invention to provide a method for processing seismic data, comprising, estimating zero-offset amplitude and amplitude variation with offset traces from the seismic for a plurality of trial moveout velocities, determining a smooth wavelet estimate, determining a stretch error by combining the wavelet estimate and zero-offset amplitude traces, removing the determined stretch error from the amplitude variation with offset traces, differentiating the estimated zero-offset amplitude traces with respect to time, estimating components of amplitude variation with offset traces that are correlated with said differentiated zero-offset amplitude traces, removing said estimated components from the amplitude variation with offset traces to obtain a new estimate of the amplitude variation with offset trace, generating a new panel of quality-of-fit coefficients for moveout velocity estimation from said estimated components, and determining moveout velocity estimates from said generated new panel.

It is an object of the present invention to provide a method for processing seismic data, comprising, estimating zero-offset amplitude and amplitude variation with offset traces from the seismic data for a plurality of trial moveout velocities, determining a smooth wavelet estimate, determining a stretch error by combining the wavelet estimate and zero-offset amplitude traces, removing the determined stretch error from the amplitude variation with offset traces, differentiating the estimated zero-offset amplitude traces with respect to time, estimating components of amplitude variation with offset traces that are correlated with said differentiated zero-offset amplitude traces, removing said estimated components from the amplitude variation with offset traces to obtain new estimate of the amplitude variation with offset trace, generating a new panel of quality-of-fit coefficients for moveout velocity estimation from said estimated components, determining velocity estimates from said generated new panel, and using the zero-offset amplitude and compensated amplitude variation with offset traces corresponding to said determined velocities for any subsequent analysis and/or processing.

These and other objects and advantages of the present invention will become apparent from the following detailed description, wherein reference is made to the Figures in the accompanying drawings.

BRIEF DESCRIPTION OF THE DRAWINGS

FIG. 3B depicts, for the data of FIG. 3A, simplified representations of the quality-of-fit coefficients of conventional velocity analysis plotted as a function of t and estimated $v_e$.

FIG. 3C depicts, for the data of FIG. 3A, simplified representations of the quality-of-fit coefficients of velocity analysis of the copending application FIG. 3D depicts, for the data of FIG. 3A, simplified representations of the quality-of-fit coefficients of the velocity analysis of the present invention using compensated B traces in accordance with the methods of the present invention, plotted as a function of t and estimated $v_e$.

DETAILED DESCRIPTION OF THE INVENTION

Figure 1:
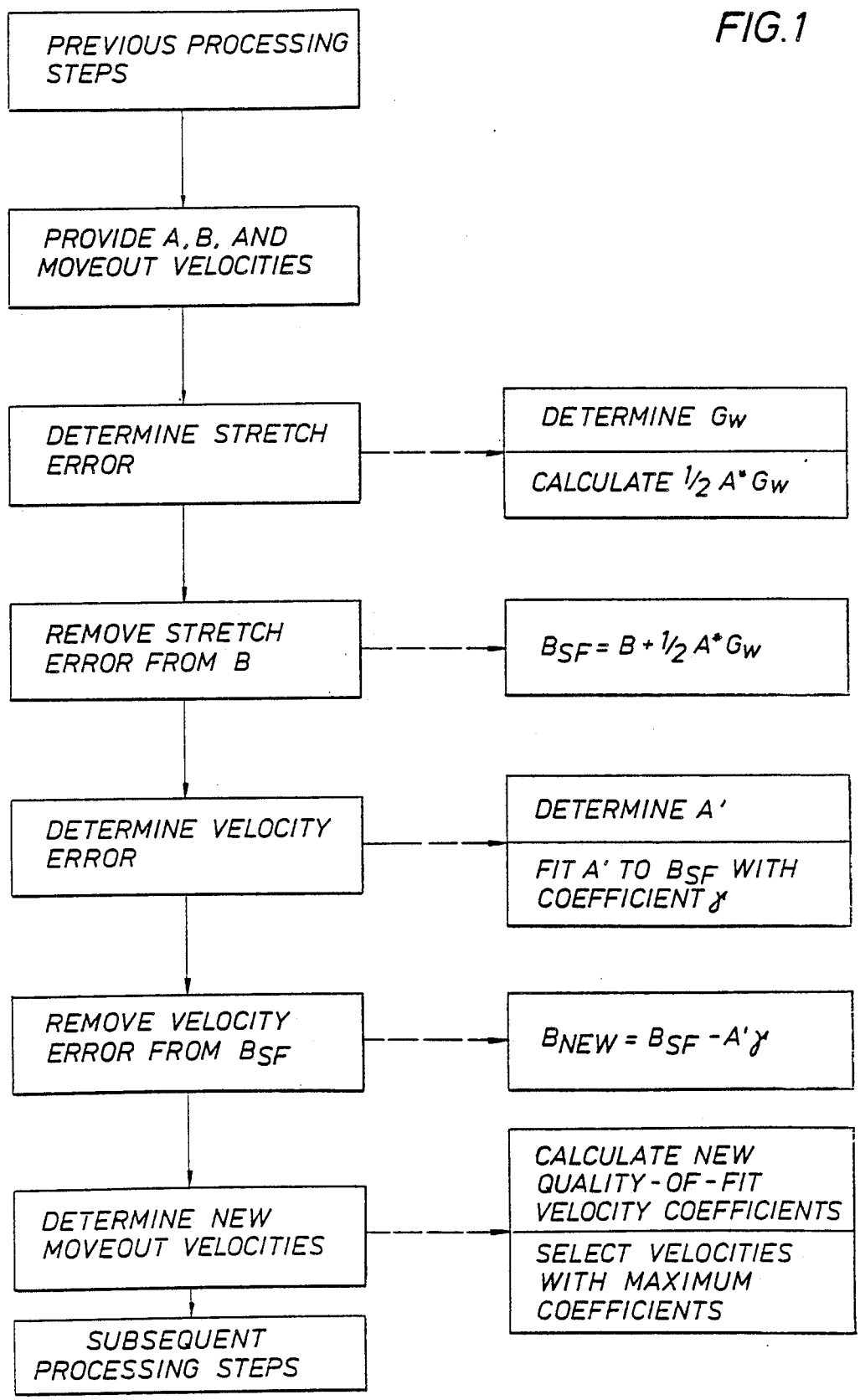
FIG. 1 depicts a simplified flow chart of the processing steps of a method of the present invention.

The present invention provides improved methods for processing conventionally acquired seismic field data. These methods provide improved estimates of normal moveout velocity analysis, including appropriate offset dependence, and accordingly improved dynamic correction of the data. The improved velocity analysis preferably uses offset dependent parameters (zero-offset amplitude and amplitude variation with offset) determined from the data. Stretch and velocity errors are removed from the offset dependent parameters; these corrected offset dependent parameters and correction coefficients may then be used to provide improved velocity panels from which improved velocities may be selected. Improved offset dependent parameters corresponding to such selected improved velocities may then be employed for further processing and/or analysis. Additional processing steps may be performed as necessary or desired before or after any of these steps. For example, the data may also be corrected for statics or otherwise manipulated to enhance signals.

The methods of the present invention which are described herein are generally discussed in terms of compressional wave (PP), seismic data acquisition and processing, which is the most common form of seismic data used in exploration seismology. It should be clearly understood that these methods are equally applicable to shear wave seismic data acquired using an appropriate shear source and appropriate shear motion detectors. Similarly, converted wave seismic data may also employ the methods of the present invention after recognizing that there is an "extra" $\sin\theta$ factor in the zero-offset and variation with offset estimates (A & B, respectively) for such converted wave data. Other than the particular acquisition techniques involved and the techniques for final interpretation of seismic attributes, the only changes necessary for the application to shear or converted data would be to replace the discussions of appropriate compressional velocities with appropriate shear or composite velocities.

While the measurement of normal moveout velocities, normal incidence reflection amplitudes, and the variation with offset of the reflection amplitudes, may be accomplished in the same manner for each of these modes of seismic propagation, the relation of these measurements to the elastic properties, velocities and/or densities of the media will not be the same. The reflection coefficients for these various modes have well known, but quite different, dependencies on the elastic constants, velocities, and/or densities of the reflecting materials.

As described in the copending application the method for moveout velocity analysis employs velocity spectra (one for each time sample) generated by dynamically correcting the seismic data with a number of trial velocity functions and determining a measure of the quality of fit of the estimated normal incidence trace and offset dependence trace to the seismic data. The optimal velocity function is selected by identifying the velocity which results in the maximum quality of fit.

The related application provides methods to simultaneously obtain accurate representations of moveout velocities, and amplitude variation with offset and zero offset (normal incidence) amplitude traces, all from seismic data. However, the amplitude variation with offset determined by these methods has been found to be sensitive to small velocity errors and thus may require some "corrections" to be made. However, these methods provide the correct offset dependence given the correct moveout velocity and in the absence of other known effects The terms "amplitude variation with offset", "variation with offset", "offset dependence of amplitude", and "offset dependence" are used interchangeably herein.

The methods of the present invention estimate the value of certain of these "corrections" to be made to offset dependent data. $S^{ideal}(t,\theta)$ is used herein as a seismic offset panel, dynamically corrected with a normal moveout velocity, $v(t)$, and having an offset dependence of reflection amplitude characterized by $A(t)+B(t)\sin^2\theta+$(higher order terms in $\sin^2\theta$). For a geometry of horizontal reflectors, a band-limited wavelet, $W(t)$, and an offset, x, if $R(t,\theta)$ is the reflection coefficient as a function of zero-offset two-way travel time t and angle of incidence $\theta(t,x)$, then the desired $A(t)$ and $B(t)$ traces of the related application are defined by:

$$S^{ideal}(t,\theta) = \int R(\tau,\theta)\,W(t-\tau)\,d\tau \tag{1a}$$

$$= A(t)+B(t)\sin^2\theta(t,x)+\text{(higher order terms in }\sin^2\theta). \tag{1b}$$

The relation between the offset x and the incidence angle $\theta$ is given by:

$$x = t\,v_e\left(\frac{v_e}{v_i}\right)\sin\theta(t,x) + \text{(higher order terms in }\sin\theta), \tag{2}$$

where $v_e$ is the RMS effective velocity and $v_i$ is the interval velocity at the reflector. In the limit of small offsets (angle of incidence less than about 30 degrees), neglecting transmission effects and assuming multiples, spherical spreading and absorption effects have been eliminated, a seismic offset panel $S(t,x)$ including ordinary tuning effects is given by $$S(t,x) = \int R(\tau,\theta)\,W\left[t - \sqrt{\tau^2 + \frac{x^2}{v_e^2(\tau)}}\right]d\tau \tag{3}$$

The NMO corrected data, which is corrected with moveout velocity $v(t)$, that is in general different from $v_e(t)$, is given by:

$$S_{NMO}(t,x) = S\left[\sqrt{t^2 + \frac{x^2}{v^2(t)}},\,x\right] = \tag{4a}$$

$$\int R(\tau,\theta)\,W\left[\sqrt{t^2 + \frac{x^2}{v^2(t)}} - \sqrt{\tau^2 + \frac{x^2}{v_e^2(\tau)}}\right]d\tau.$$

and may be represented adequately by an expression of the form, $$S_{NMO}(t,x) = A(t)+B(t)\sin^2\theta(t,x)+\text{(higher order terms in }\sin^2\theta). \tag{4b}$$

The estimated traces $A(t)$ and $B(t)$ are usually obtained by a least squares fit (or other similar technique) of an equation of the type of (4b) to the data. Normally, the higher order terms in $\sin^2\theta$ *may be neglected in determining A and B, however, these higher order terms may be employed, if desired. Since A and B are estimated from NMO corrected data, they will not be exactly the same as A and B in equation* (1), even for noise free data. There are systematic effects which contaminate these estimates. Two of these effects are discussed in detail hereinbelow. Expanding the integral in equation (4a) in powers of x and using equation (2) the following relations between the A and B traces defined in equation (1b) and their estimate $\tilde{A}$, $\tilde{B}$ may be obtained as follows:

$$\tilde{A}(t) = A(t) = \int R(\tau,0)\,W(t-\tau)d\tau. \tag{5}$$

$$\tilde{B}(t) = B(t) + \delta B(t) \tag{6}$$

where the error $\delta B(t)$ is given by:

$$\delta B(t) = \frac{(v_e(t)\,t)^2}{2}\left(\frac{v_e}{v_i}\right)^2 \int R(\tau,0)\left[\frac{1}{t\,v^2(t)} - \frac{1}{\tau\,v_e^2(\tau)}\right]W'(t-\tau)d\tau. \tag{7}$$

where $W'$ is the time derivative of the wavelet, W. Expanding the term $\tau\,v_e^2(\tau)$ in the intergrand in equation (7) to first order in $t-\tau$ and using the definition of $v_e$ as the RMS effective velocity, and after some algebra, $\delta B$ can be approximated by the following:

$$\delta B(t) = \tfrac{1}{2}t\left(\frac{v_e}{v_i}\right)^2\left[\left(\frac{v_e}{v}\right)^2 - 1\right]A'(t) - \tfrac{1}{2}Q(t), \tag{8}$$

where $A'$ is the time derivative of A, the zero-offset trace, and where, $$Q(t) = \int R(\tau,0)(t-\tau) \, W'(t-\tau) \, d\tau = R(t,0)*[tW'(t)]. \quad (9)$$

and the * represents a convolution. This relationship in equation (8) can be derived in alternative ways.

The first term on the right hand side of equation (8) vanishes if the moveout correction velocity v(t) equals the true RMS velocity $v_e(t)$, and represents the error in B due to a moveout velocity error. This dependence of the velocity-induced error in B on the derivative of the normal incidence trace (A') has been noted by Spratt (Spratt, S., 1987 SEG Expanded Abstracts, S 10.7), but no way to remove this error was disclosed or suggested.

The second term on the right hand side of equation (8) is independent of small errors in the moveout velocity, it represents a "stretch" error. As noted earlier herein, the conventional process of hyperbolic normal moveout correction introduces an effect on the seismic data which is commonly referred to as "stretch". For a discussion of stretch see "Effect of Normal Moveout on a Seismic Pulse", by Dunkin, J. W. and Levin, F. K. Geophysics, Vol. 38, No. 4, pp 635-642 (1973). This velocity independent error in B has been noted by Swann (Swann, H. W., 1988 SEG Expanded Abstracts, S 20.2), but no way to remove this error was disclosed or suggested.

To estimate the effect of the stretch error from equation (9), it is sufficient to obtain a band-limited version of R(t,O). To get this information the value of A(t) can be used together with equation (5) and knowledge of the wavelet W(t). However, it is possible to write an expression that gives Q(t) directly in terms of A(t) without having to get, as an intermediate step, the value of R(t,O) within the bandwidth of W; this expression is as follows:

$$Q(t) = A(t)*G_w(t), \quad (10)$$

where the filter $G_w(t)$ is given in the frequency domain, within the bandwidth of A(t), by $$G_w(f) = -\frac{1}{W} \frac{d}{df}(fW) = -\left[1 + \frac{f}{W} \frac{d}{df} W\right]. \quad (11)$$

with $G_w(f)$ and W(f) being the frequency domain representation of the filter wavelet, respectively. Equations (8), (10), and (11) are employed in the methods of the present invention to determine a stretch error thereafter remove it.

The stretch error is fixed by the value of the A trace and the shape the wavelet, and thus is independent of the actual value of the B trace. The wavelet estimate may be a known zero-phase or non-zero phase processing wavelet or may be estimated from the data. If the wavelet is estimated from the data, it is important that the estimated wavelet be of a short time duration and that the spectrum of the wavelet be smooth. For typical acquisition parameters and typical seismic wavelets, the foregoing equations predict an estimate of the stretch error portion of $\delta B$ to be about the same size as A.

The stretch error represents an important effect in the estimation of the offset dependence trace from the NMO corrected data. Its value is, by definition, insensitive to the normal moveout velocity error and depends only on the form of the wavelet and the value of the zero offset trace. The zero offset trace (A) usually can be reliably estimated and thus it is possible to write expressions that use it to correct for the stretch error, as noted hereinabove. Further, it is presently preferred that the stretch error be removed before any velocity error correction is made.

It should be noted that since the conventional stack response can be constructed from a linear combination of the A and B traces, the method described herein to remove stretch effects can be used to remove the stretch effect from conventional stacked data as well.

The dependence of a velocity-induced error in B may be compensated for or removed by taking advantage of the dependence of this error on the derivative of A. The velocity-induced error portion of $\delta B$, even for relatively small velocity errors, can be several times the typical size of A. Preferably, the stretch error is removed from B before estimating the velocity error and removing its effect from B, as well as re-estimating moveout velocities.

As noted in the related application, the determination of A from the data is insensitive to moveout velocity error and thus an accurate estimate of A and therefore A' is generally available. The preferred method of the present invention takes advantage of this fact to improve the estimate of the offset dependence trace, B, as well as to further improve the moveout velocity analysis and resolution discussed in the related application.

For an isolated event, with a finite length wavelet, the time series representation of B is simply a scaled version of A, and the integral of BA' over the entire wavelet must be zero for the true, uncontaminated, B-trace. In the many-reflector case this is not true unless the B trace is simply a scaled version of the A trace, or B is essentially random with respect to A. Simple synthetic seismograms with realistic offset dependence indicate that with time gates on the order of 200 msec, (i.e. several times the dominant wavelength), the correlation of B and A' is small with respect to the velocity error effects being corrected. In the preferred method described herein, the assumption is made that B and A' are uncorrelated at the correct $v_e(t)$.

FIG. 1 depicts the presently preferred sequence of steps of the present invention of initially determining a stretch error and then removing that determined stretch error from B to obtain $B_{SF}$ (i.e., $B_{stretch\ Free}$), followed by determining the velocity error, and then removing the determined velocity error, and finally determining more accurate moveout velocities, and the A and B traces associated with these determined velocities. Determining and removing stretch error has been discussed previously herein.

In general and as noted in FIG. 1, the velocity error in B is estimated from the time derivative of A, i.e. A', as follows. A coefficient, $\gamma$, is used to estimate the A' component in the measured B trace over some time gate. This coefficient and A' are then combined ($\gamma A'$) and removed from the measured B trace to provide an improved estimate of B, i.e. $B_{New}$. $B_{New}$ may then be used with A for any subsequent analysis, as disclosed in the related application. In particular $B_{New}$ may be used to determine new quality-of-fit coefficients for velocity spectra. Alternatively, the coefficient $\gamma$ may be combined with the old velocity spectra to provide new velocity spectra. These new spectra allow for a better, improved determination of moveout velocity and accordingly better, improved dynamically corrected data. The A and $B_{New}$ that correspond to the improved moveout velocity are the best estimate of A and B, and are used for any subsequent analysis or processing. It should be noted that at the correct velocity $B_{New}$ and B are the same.

The detailed steps of the presently preferred method of the present invention for removing moveout velocity error, are as follows:

1. for each trial velocity (or velocity function) estimate A and B traces in the least-squared-error sense, as noted in the related application, and then preferably remove any stretch error (as noted earlier herein) from B to obtain $B_{SF}$ (i.e., $B_{Stretch\ Free}$);
2. for each trial velocity, differentiate the estimated A-trace with respect to time;
3. for each trial velocity, estimate the term $\gamma = t[(v_e/v)^2 - 1]/2$ in equation (4) by minimizing the term $(B_{SF} - \gamma A')^2$ with respect to $\gamma$ over some time gate, $\Delta t$, ($\gamma$ is assumed to be a slowly varying function of time, since the effective velocity and velocity error vary slowly) giving $$\gamma = \sum_{\Delta t} A'B_{SF} / \sum_{\Delta t} A'^2;$$

4. use this term, $\gamma$, to compute a new estimate of the offset dependence B-trace as $B_{new} = B - \gamma A'$;
5a. use $B_{New}$ to compute the RMS error in the fit to the dynamically corrected data panel as $$RMS(t) = \left[ \sum_x [S(t,x) - (A(t) + B_{new}(t)\sin^2\theta)]^2 \right]^{\frac{1}{2}}$$

5b. use this new RMS error to generate new velocity spectra (quality-of-fit coefficient panel) for moveout velocity estimation as noted in the related application, or
5'. use $\gamma$ in a corridor weighting function to generate new velocity spectra from the old (i.e., use a function like $e^{31\gamma^2\alpha}$ as a weighting function for the quality-of-fit coefficient, where $\alpha$ is a constant selected to achieve the corridor effect);
6. select a new velocity that maximizes the coefficients in the panel and use the A and $B_{New}$ that correspond to this velocity for any subsequent analysis, interpretation, or processing.

Thus, the preferred method of the present invention employs velocity scans to pick improved moveout velocities. However, the method may also be employed to remove errors in B measured with a velocity that arises from interpolation of the velocity function between locations where the velocity has been picked velocity; this is normally useful for stacked data.

Figure 2A:
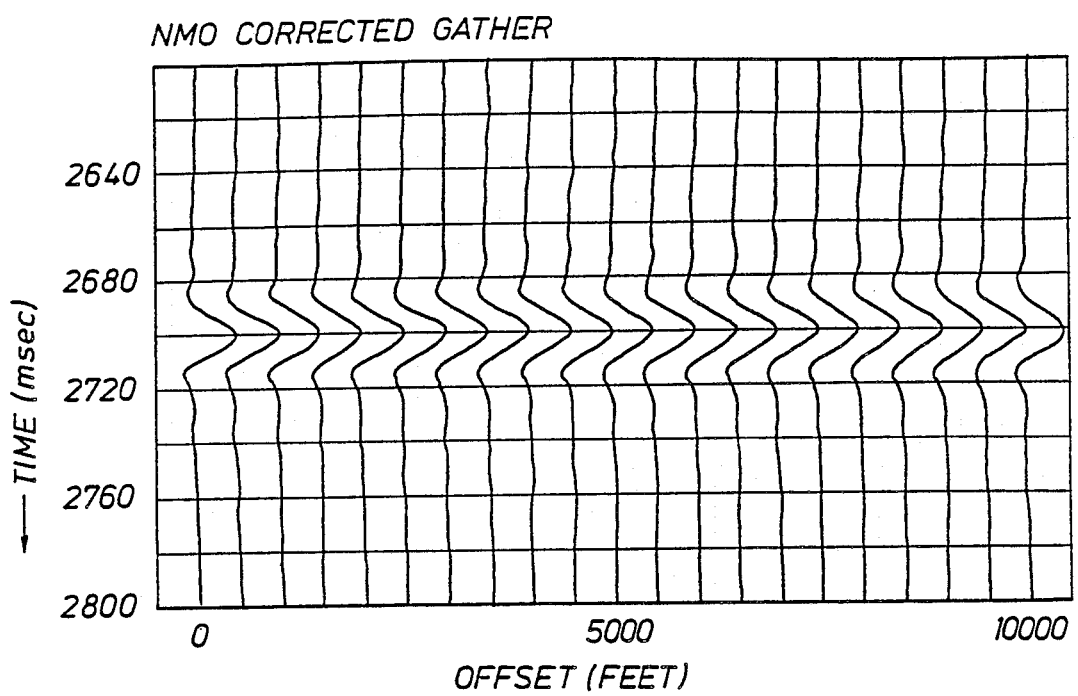
FIG. 2A depicts a gather of synthetic seismic data for offsets from x=zero to 10,000 feet for a reflector at 10,000 feet with a moveout velocity of 7500 feet per second corrected with the true moveout velocity.

To illustrate the significance of this method of this consider the following two synthetic examples. The first synthetic example is a single reflector at depth (z) of 10,000 ft with no offset dependence to the reflection amplitude (i.e. B/A=0), with exact hyperbolic moveout with a velocity of 7500 ft/sec and convolved with a 8-40 Hz wavelet. The offset range goes from zero to 10,000 ft. The NMO corrected gather of this synthetic data is shown in FIG. 2A.

Figure 2B:
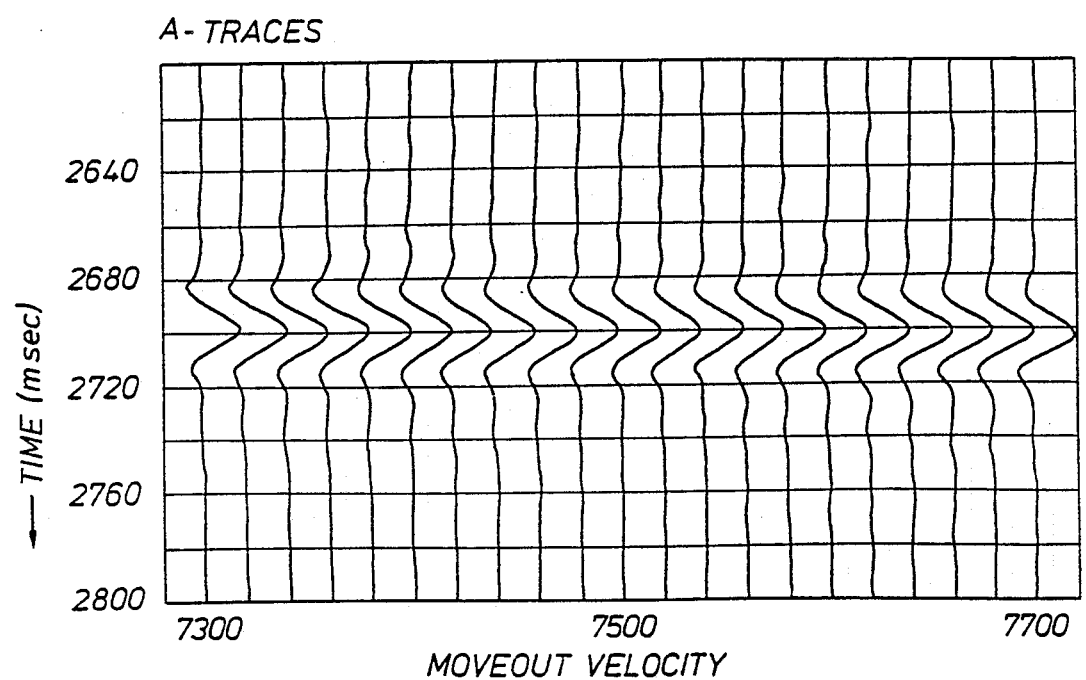
FIG. 2B depicts the effect of different moveout velocities for the model of FIG. 2A for a least square fit zero-offset amplitude trace and includes the correct moveout velocity.
Figure 2C:
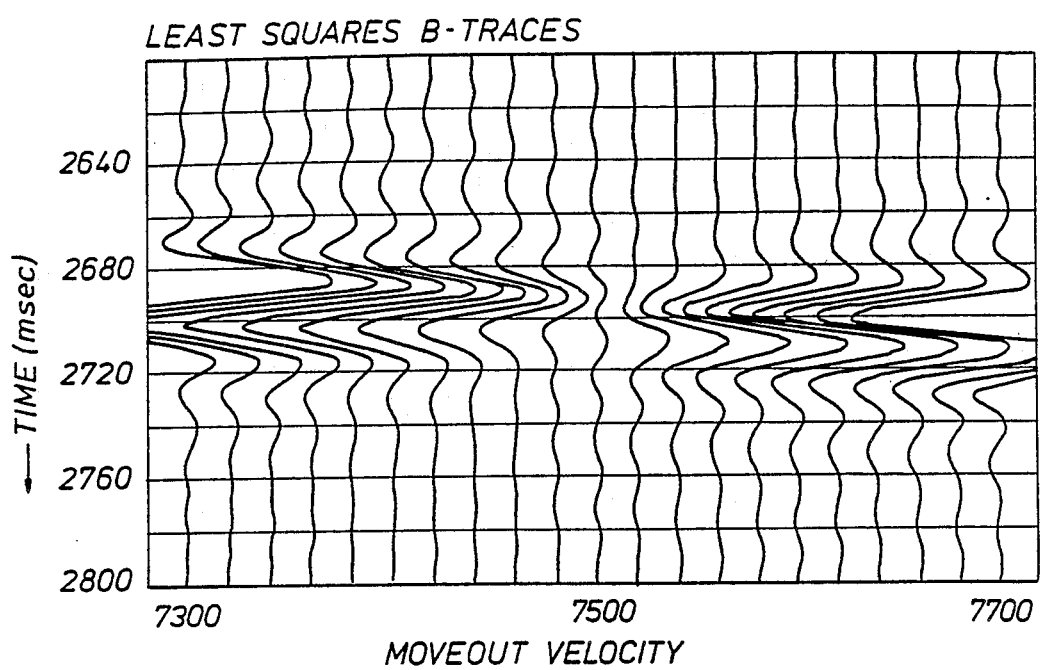
FIG. 2C depicts the effect of different moveout velocities for the model of FIG. 2A for a least square fit of amplitude variation with offset trace and includes the correct moveout velocity.

The A and B traces are estimated using a least square fit to the NMO corrected data obtained with different moveout velocities. FIGS. 2B and 2C show the least square estimation of A and B for these various velocities. FIG. 2B shows zero-offset traces, A, estimated by a least square error fit to the data of the synthetic corrected with different moveout velocities (from 7300 ft/sec to 7700 ft/sec). From FIG. 2B, it may be seen that is relatively insensitive to moveout velocity error. FIG. 2C shows each B trace estimated by a least square error fit to the data of FIG. 2A corrected with a different moveout velocities (from 7300 ft/sec to 7700 ft/sec). The B-trace estimated from the synthetic data corrected with the true moveout velocity (7500 ft/sec) is in the center and has essentially zero amplitude, as expected. The B trace, even at the true moveout velocity (7500 ft/sec), deviates largely from the value of the B trace (zero). Note that the scale on the B-trace is reduced by a factor of one-half from that used on the original synthetic panel of FIG. 2A. Even very slight errors in the trial moveout velocity $v_e$, i.e. ±20 ft/sec, make a significant difference in the measured offset dependence or variation with offset traces.

Figure 2D:
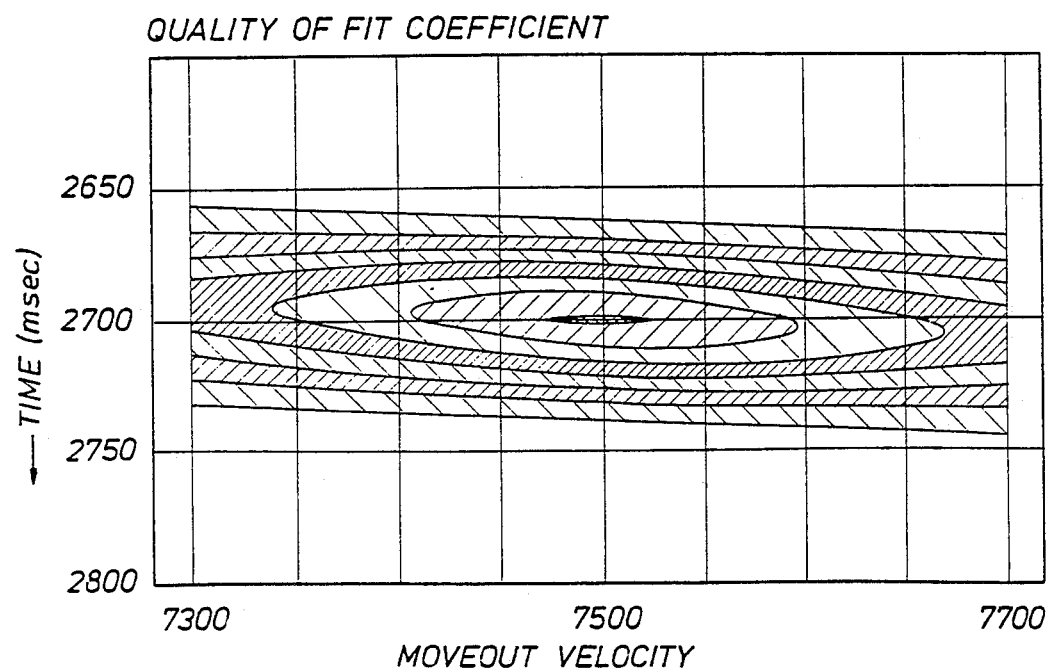
FIG. 2D depicts the velocity quality-of-fit coefficient panel for the A and B traces of FIGS. 2B and 2C.

The velocity quality-of-fit coefficient panel shown in FIG. 2D are the residual (RMS) error in the least square error fit of the offset data of the synthetic model to the A and B traces corrected with each moveout velocity. The quality-of-fit, as indicated by the shaded bands of this panel, is excellent for moveout velocities within ±100 ft/sec of the true moveout velocity (which means that quality-of-fit coefficients will not resolve velocity very well) while the estimated variation with offset trace is varying dramatically. It is this apparent coupling between variation with offset and velocity which the methods of the present invention seek to quantify and remove.

Figure 2E:
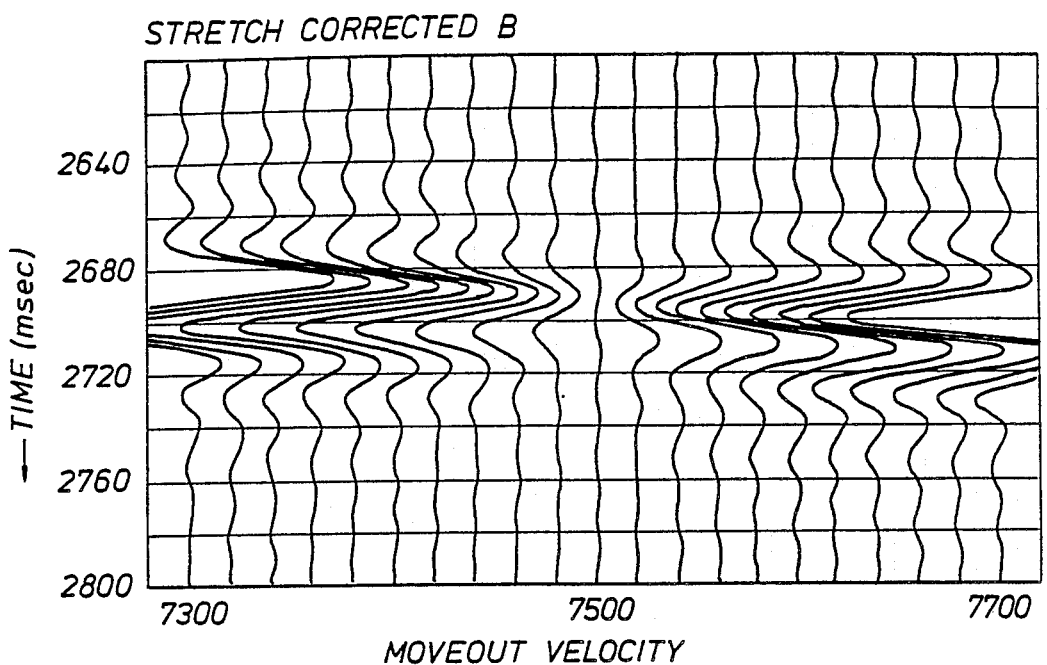
FIG. 2E depicts the amplitude variation with offset trace of FIG. 2C after the stretch error is removed.
Figure 2F:
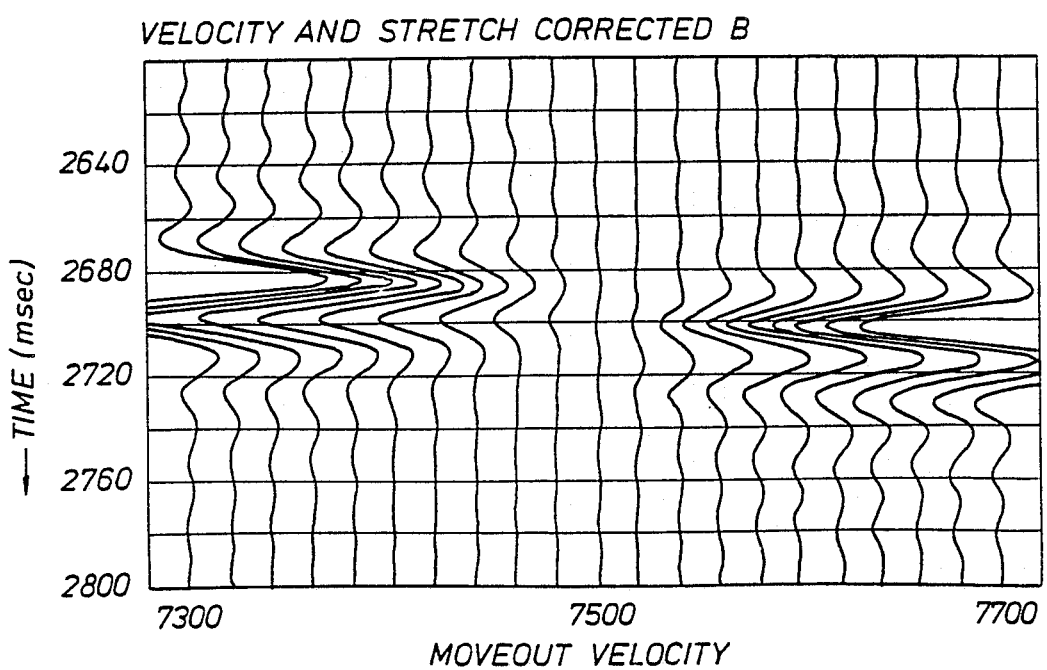
FIG. 2F depicts the amplitude variation with offset trace of FIG. 2C after stretch and velocity errors are removed.

In FIG. 2E the B-traces computed as in FIG. 2C have been compensated for stretch error corrections, computed using equation (10) as described hereinbefore. Note that these traces are somewhat less sensitive to moveout velocity errors. It is seen that if $v \neq v_e$ the contribution due to the velocity errors is very large. In FIG. 2F these compensated B-traces have been further compensated for first order velocity corrections, as described hereinbefore (i.e., $B_{New}$ of step 4 above). Note that these traces are significantly less sensitive to moveout velocity errors. Now the corrected B trace is much more stable near the true RMS velocity. Thus, the current preference for removing stretch error before removing any velocity error followed by re-estimating moveout velocity. The residual discrepancies for large moveout velocity errors are due to additional errors introduced by the least square estimation of the B trace.

Figure 2G:
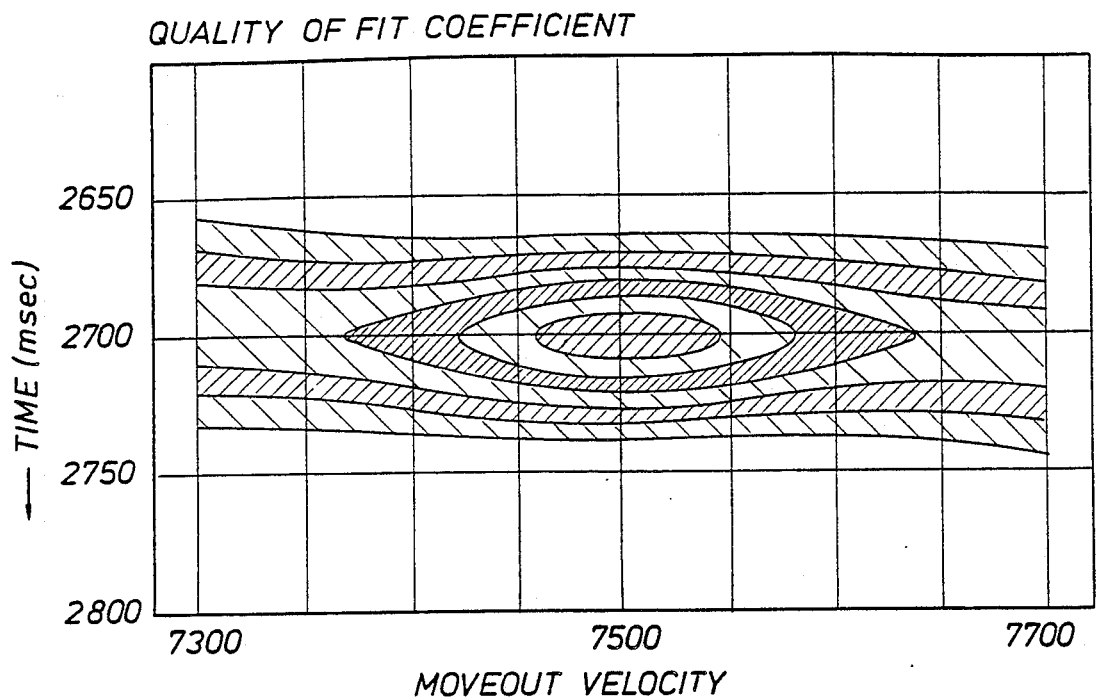
FIG. 2G depicts the quality-of-fit panel of FIG. 2D modified by using the compensated B traces of FIG. 2F.
Figure 2H:
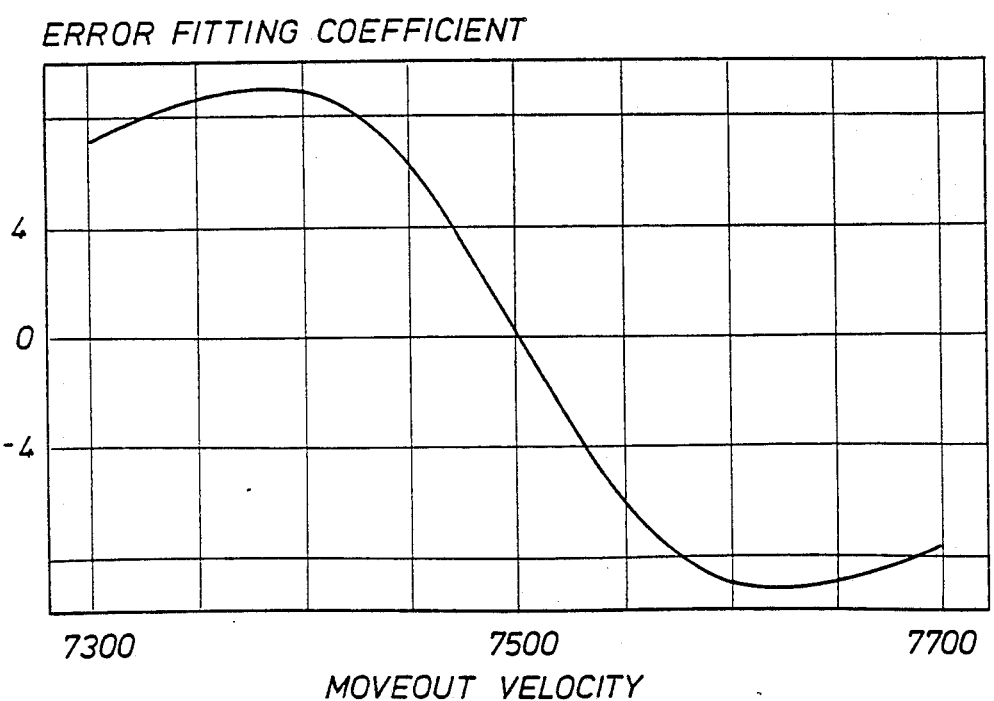
FIG. 2H depicts the fitting coefficient, $\gamma$, used to estimate the first order velocity error corrections.
Figure 2I:
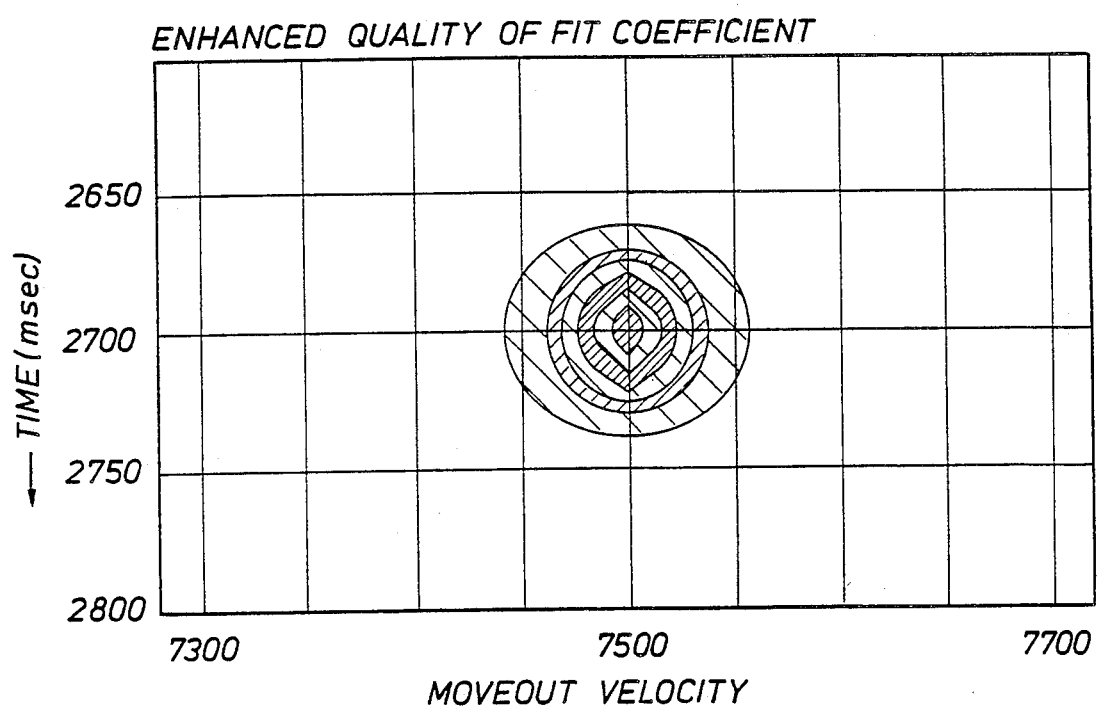
FIG. 2I depicts the quality-of-fit panel of FIG. 2D modified by a corridor weighting function using the fitting coefficient $\gamma$.

In FIG. 2G these compensated B-traces have been used to recompute the quality-of-fit panel of FIG. 2D. FIG. 2H shows the fitting coefficient $\gamma$. FIG. 2I shows the panel of FIG. 2D weighted by a corridor weighting function using $\gamma$. The modified quality-of-fit panel is now a very sensitive indicator of the correct moveout velocity. Using the quality-of-fit coefficients for this FIG. 2I panel, it would be much easier to pick velocities than those in FIG. 2D.

Figure 3A:
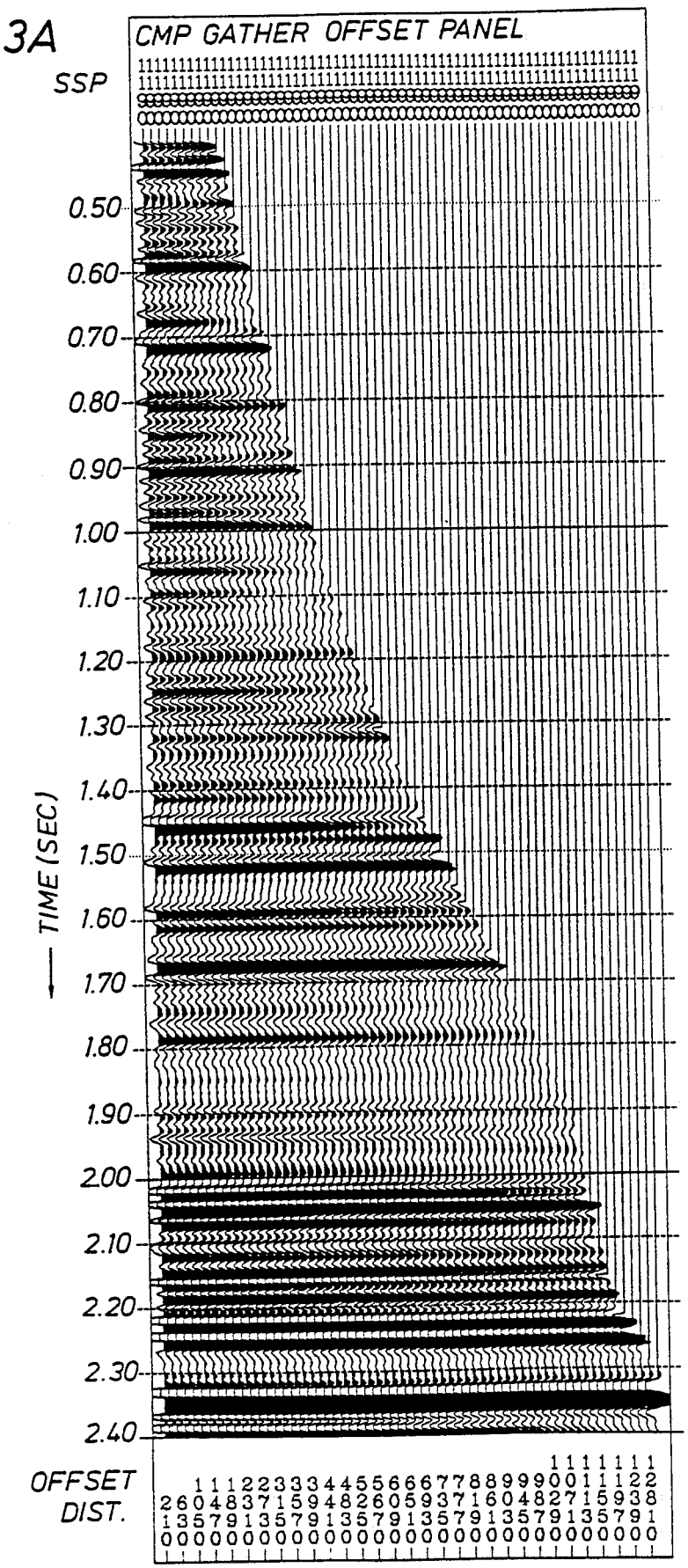
FIG. 3A depicts synthetic seismic common mid-point reflection data dynamically corrected with correct velocities.
Figure 3E:
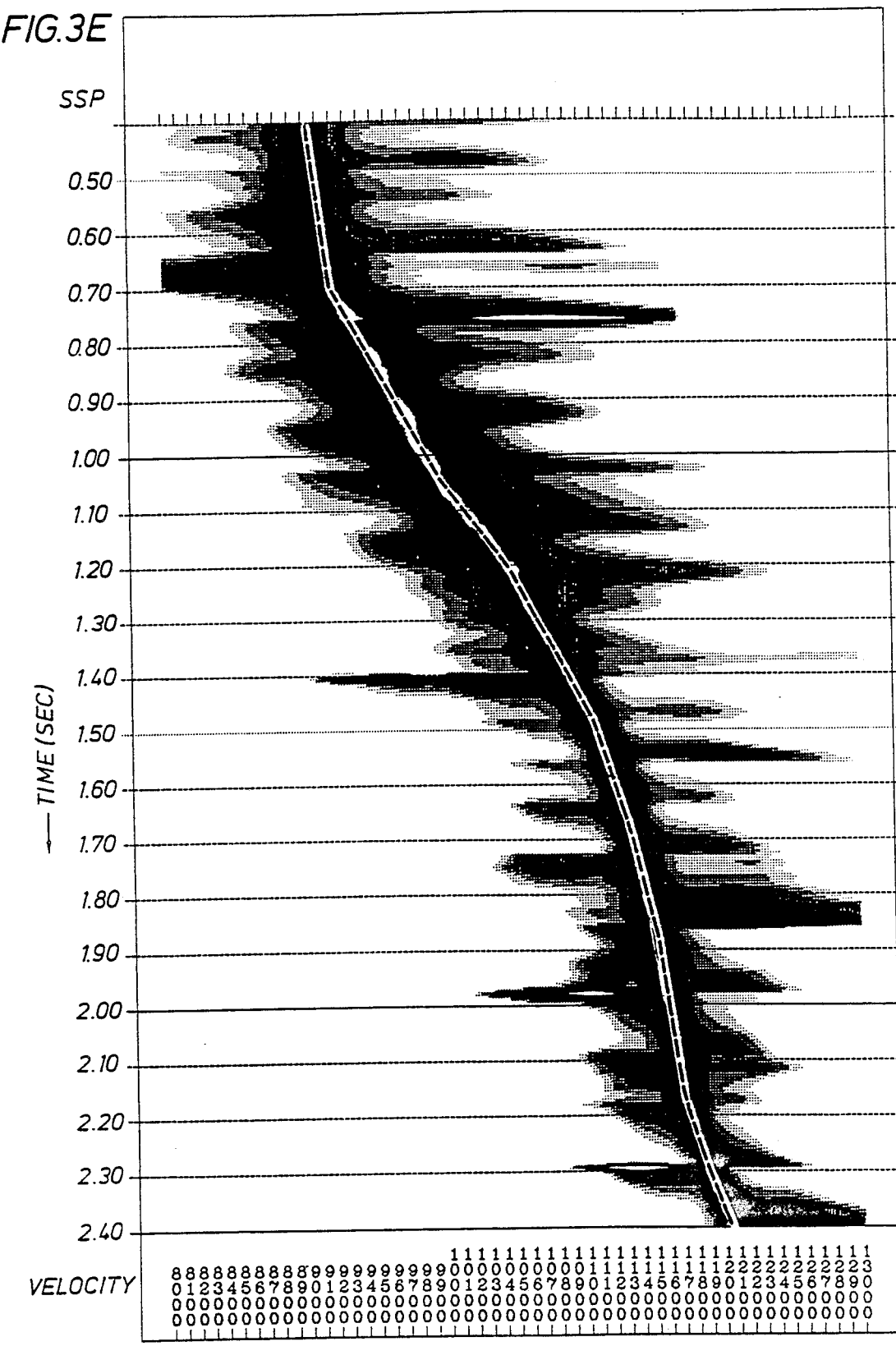
FIG. 3E depicts, for the data of FIG. 3A, simplified representations of the quality-of-fit coefficient panel of FIG. 3C modified by a corridor weighting function in accordance with the methods of the present invention.

The second synthetic data set used is an example where offset dependence couples strongly with conventional velocity analysis. The model is derived from well-logs and involves lithology sequences which cause a significant amount of variation of the offset dependence of reflection amplitudes. The dynamically corrected data is reproduced in FIG. 3A. A conventional quality-of-fit velocity spectrum is shown in FIG. 3B; the quality-of-fit coefficients are displayed as a function of velocity (horizontal axis) and time (vertical axis). For these displays of the quality of fit coefficients contouring and grey scale shadings were employed. Other displays may be employed. The shading of the grey scale is representative of the amplitude of the quality-of-fit coefficient (with a darker shading indicating a higher amplitude than an adjacent lighter shading except where the grey scale repeats, i.e. the light to dark scale repeats to allow coverage of a large range of amplitudes with a small number of different shadings). The true velocity is shown by the dashed-line curve on each panel. A quality-of-fit velocity spectrum as taught in the related application is shown in FIG. 3C and a corresponding quality-of-fit velocity spectrum of the present invention where the compensated B-trace described above has been used to calculate the RMS error for the quality-of-fit coefficients is shown in FIG. 3D. FIG. 3E is the "corridor"version of FIG. 3D. Clearly, velocities are much more easily "picked", or selected, using this corridor version of a velocity panel.

Thus, the velocity correction method of the present invention removes determined velocity error from B to allow for a determination of a new and more accurate moveout velocity, and thereby improved estimates of A and B.

The specific sequence of steps described hereinbefore for the methods of the present invention may be changed and still achieve the same result without departing from the scope of the present invention. As noted hereinbefore, the methods of the present invention are applicable to both compressional wave, shear wave seismic, and/or mode converted exploration techniques. Further, although the errors discussed herein have been discussed in terms of hyperbolic normal moveout other more general methods for normal moveout could be employed and the errors discussed herein re-derived based upon such more general methods.

Many other variations and modifications may be made in the techniques hereinbefore described, by those having experience in this technology, without departing from the concepts of the present invention. Accordingly, it should be clearly understood that the methods depicted in the accompanying drawings and referred to the foregoing description are illustrative only and are not intended as limitations on the scope of the invention.

What is claimed is:

1. A method for processing seismic data, comprising:
   estimating zero-offset amplitude and amplitude variation with offset traces for each of a plurality of trial velocities from said seismic data,
   differentiating the estimated zero-offset amplitude traces with respect to time,
   estimating components of amplitude variation with offset traces that are correlated with said differentiated zero-offset amplitude traces,
   removing said estimated components from the amplitude variation with offset traces to obtain a new estimate of the amplitude variation with offset trace,
   generating quality-of-fit velocity coefficients for moveout velocity estimation from said estimated components, and
   determining moveout velocity estimates from said generated quality-of-fit velocity coefficients 2. A method for processing seismic data, comprising:
   estimating zero-offset amplitude, A, and amplitude variation with offset, B, traces for each of a plurality of trial velocities from said seismic data,
   differentiating the estimated zero-offset amplitude, A, traces with respect to time,
   estimating components of amplitude variation with offset, B, traces that are correlated with said differentiated zero-offset amplitude traces,
   removing said estimated components from the amplitude variation with offset traces to obtain a new estimate, $B_{new}$, of the amplitude variation with offset trace,
   computing an RMS error in the least squares fit of dynamically corrected data to a form $A + B_{new} \sin^2\theta$ using the new estimate of amplitude variation with offset traces,
   generating quality-of-fit velocity coefficients for moveout velocity estimation from said RMS error, and
   determining moveout velocity estimates from said generated quality-of-fit velocity coefficients.

3. A method for processing seismic data, comprising:
   estimating zero-offset amplitude and amplitude variation with offset traces from the seismic data for a plurality of trial moveout velocities,
   determining a smooth wavelet estimate,
   determining a stretch error by appropriately combing the wavelet estimate and zero-offset amplitude traces,
   removing the determined stretch error from the amplitude variation with offset traces,
   differentiating the estimated zero offset amplitude traces with respect to time,
   estimating components of amplitude variation with offset traces that are correlated with said differentiated zero-offset amplitude traces,
   removing said estimated components from the amplitude variation with offset traces to obtain a new estimate of the amplitude variation with offset trace,
   generating quality-of-fit velocity coefficients for moveout velocity estimation from said estimated components, and
   determining moveout velocity estimates from said generated quality-of-fit velocity coefficients.

4. A method as described in claim 3, further comprising: determining zero-offset amplitude and amplitude variation with offset traces corresponding to said determined moveout velocity estimates.

5. A method as described in claim 4, further comprising: determining elastic properties and densities of subsurface materials from said determined moveout velocity estimates, zero-offset amplitude traces and amplitude variation with offset traces.

* * * * *